(12) United States Patent
Kato

(10) Patent No.: US 9,144,194 B2
(45) Date of Patent: Sep. 29, 2015

(54) ROTARY CUTTER FOR BRUSH CUTTER

(71) Applicant: Hiroki Kato, Tokyo (JP)

(72) Inventor: Hiroki Kato, Tokyo (JP)

(73) Assignee: STARTING INDUSTRIAL CO., LTD., Tokyo (JP)

( * ) Notice: Subject to any disclaimer, the term of this patent is extended or adjusted under 35 U.S.C. 154(b) by 140 days.

(21) Appl. No.: 13/801,082

(22) Filed: Mar. 13, 2013

(65) Prior Publication Data

US 2013/0283989 A1 Oct. 31, 2013

(30) Foreign Application Priority Data

Apr. 25, 2012 (JP) ................................ 2012-100381

(51) Int. Cl.
*B26B 7/00* (2006.01)
*A01D 34/416* (2006.01)
*A01D 34/90* (2006.01)

(52) U.S. Cl.
CPC .......... *A01D 34/416* (2013.01); *A01D 34/4166* (2013.01); *A01D 34/90* (2013.01); *Y10T 83/9292* (2015.04)

(58) Field of Classification Search
USPC .......................... 30/276, 347; 83/651; 56/12.7
See application file for complete search history.

(56) References Cited

U.S. PATENT DOCUMENTS

| | | | | |
|---|---|---|---|---|
| 4,203,212 A * | 5/1980 | Proulx | ............................ | 30/276 |
| 4,259,782 A * | 4/1981 | Proulx | ............................ | 30/276 |
| 4,566,189 A * | 1/1986 | Muto | ............................ | 30/276 |
| 4,633,588 A * | 1/1987 | Pittinger, Jr. | .................... | 30/347 |
| 4,656,739 A * | 4/1987 | Pittinger, Jr. | .................... | 30/276 |
| 4,672,798 A * | 6/1987 | Ota | ................................ | 56/12.7 |
| 5,060,384 A * | 10/1991 | Everts | ............................ | 30/276 |
| 5,109,607 A * | 5/1992 | Everts | ............................ | 30/276 |
| 5,765,287 A * | 6/1998 | Griffini et al. | ................. | 30/276 |
| 5,881,464 A * | 3/1999 | Collins et al. | .................. | 30/276 |
| 6,148,523 A * | 11/2000 | Everts et al. | .................... | 30/276 |
| 6,401,344 B1 | 6/2002 | Moore et al. | | |
| 6,446,345 B1* | 9/2002 | Tsunoda et al. | ................ | 30/276 |
| 7,581,322 B2* | 9/2009 | Proulx | ............................ | 30/276 |
| 7,607,232 B2* | 10/2009 | Pfaltzgraff | ...................... | 30/276 |
| 7,882,642 B2* | 2/2011 | Proulx | ............................ | 30/276 |
| 7,979,991 B2* | 7/2011 | Pfaltzgraff | ...................... | 30/276 |
| 8,001,694 B2* | 8/2011 | Sing et al. | ........................ | 30/276 |
| 8,025,249 B2* | 9/2011 | Alliss et al. | ............... | 242/388.1 |
| 8,745,879 B2* | 6/2014 | Alliss | .............................. | 30/276 |

(Continued)

FOREIGN PATENT DOCUMENTS

WO WO 2005/074668 8/2005

OTHER PUBLICATIONS

Extended European Search Report dated Aug. 5, 2013 issued in European Patent Application No. 13165193.7, 8 pp.

*Primary Examiner* — Omar Flores Sanchez
(74) *Attorney, Agent, or Firm* — Nixon & Vanderhye P.C.

(57) ABSTRACT

A rotary cutter for a brush cutter includes a head main body having a cord guide hole and a pressure member having a cord inserting guide hole formed to radially penetrate through the pressure member. The pressure member is operable between a first state in which the cord inserting guide hole of the pressure member is aligned with the cord guide hole of the head main body so that a cutting cord is insertable into the head main body; a second state in which the pressure member is pushed inwardly of the head main body from the first state; and a third state in which the pressure member is rotated with respect to the head main body from the second state so that the inserted cutting cord is made into a bent state.

4 Claims, 5 Drawing Sheets

(56) References Cited

U.S. PATENT DOCUMENTS

| | | | |
|---|---|---|---|
| 8,745,880 B2* | 6/2014 | Kato | 30/276 |
| 2004/0148784 A1* | 8/2004 | Grace | 30/276 |
| 2007/0130781 A1* | 6/2007 | Iacona | 30/276 |
| 2008/0155837 A1 | 7/2008 | Moore | |
| 2008/0168664 A1* | 7/2008 | Iacona | 30/276 |

* cited by examiner

ROTARY CUTTER FOR BRUSH CUTTER

CROSS-REFERENCE TO RELATED APPLICATION(S)

This application claims priority/priorities from Japanese Patent Application No. 2012-100381 filed on Apr. 25, 2012, the entire contents of which are herein incorporated by reference.

FIELD

The present invention relates to a rotary cutter for a brush cutter for cutting grass and the like by rotating a head from which a cutting cord radially extends, more specifically, to a directly-attaching type (non reel-winding type) rotary cutter in which a reel for winding the cutting cord thereon is not provided, but the cutting cord is directly attached to the head and is replaced whenever it becomes short by being worn.

BACKGROUND

Generally, a brush cutter includes a motor, a rotary shaft connected to the motor and a head connected to the rotary shaft, and a cutting cord (mainly made of nylon) is radially extended from the head. Thus, such brush cutter can perform a brush cutting operation for cutting grass and the like using the cutting cord by rotating the head.

There is proposed a reel-winding type rotary cutter in which a reel for winding a cutting cord thereon is mounted on the head. For example, such reel-winding type rotary cutter is configured so that the cutting cord is pulled out from the reel by pressing the cutter against the ground or striking the head while it is rotating, or maximally increasing the rotation of the motor. However, the operation of pressing/striking may be dangerous as it causes scattering of small stones, and the operation of maximally increasing the rotation may cause the increase in weight as it requires the complex structure. Further, above-mentioned operations not only may impart large loads on the motor and the cutter encounter but also may result in the unstable cord pull-out operation.

In view of above, there is also proposed another reel-winding type rotary cutter which is configured so that the cutting cord is automatically pulled out from the reel when the cutting cord is worn and shortened during the brush cutting operation. For example, the cord is automatically pulled out when it becomes short due to the change of the centrifugal force. Thus, the above-mentioned operations of pressing/striking or increasing the rotation are not necessary, and the cord pull-out operation can be performed simply and safety. On the other hand, the number of components of the head is increased. Thus, the structure of the head is complicated, thereby increasing the cost of the cutter. Further, since the head becomes heavy, the cutter also becomes heavy.

In view of above, there is proposed a directly-attaching type (non reel-winding type) rotary cutter in which a reel for winding a cutting cord thereon is not provided, but a cutting cord of a suitable length is directly attached to the head and is replaced when it becomes short by being worn. For example, US-2008-155837-A proposes a directly-attaching type rotary cutter in which a head main body (for example, a head 100) is constituted of a case (for example, a lower cover 106) and a cover (for example, an upper cover 105). A cord guide hole through which a cutting cord is inserted is defined in the head main body. A U-like-shaped pressure member (for example, a button 210 and a locking blade 300) with cord penetration holes (for example, clamp slots 305, 306) is incorporated within the head main body so as to be slidable in a direction perpendicular to the cord guide hole against a spring (for example, a spring 220). A nut (for example, an arbor 420) for connecting a rotation drive shaft is incorporated within the central portion of the head main body so as to block between the cord penetration holes of the pressure member. The nut also has a penetration hole (for example, a channel hole 199).

To attach the cutting cord onto the head main body, first, the pressure member is pushed inwardly of the head main body against the spring so that its cord penetration holes are aligned with the cord guide hole of the head main body and the penetration hole of the nut. Then the cutting cord is inserted into the cord guide hole of the head main body, the cord penetration holes of the pressure member and the penetration hole of the nut, so that two end portions of the cord are projected outwardly of the head main body. Next, the pressure onto the pressure member is released so as to be pushed back outwardly of the head main body by the spring. Thus, the cord penetration holes of the pressure member are shifted from the cord guide hole of the head main body and the penetration hole of the nut, and the cutting cord is fixed to the head main body in the bent state.

The above-mentioned directly-attaching type rotary cutter has the following disadvantages.

(1): Since the diameter of the cord guide hole defined in the head main body and the diameter of the cord penetration holes formed in the pressure member are determined, it is not possible to cope with a cutting cord of various thicknesses (diameters).

(2): To attach or remove the cutting cord onto or from the head main body, since it is necessary to move the pressure member to align its cord penetration holes with the cord guide hole, required time and labor are increased.

(3): Since the U-like-shaped pressure member is incorporated at one side of the head main body, the weight balance of the head main body is deteriorated, and the vibration may be caused.

(4): Since the cutting cord is held at the cord penetration holes of the pressure member, the holding force of the cutting cord may not be sufficient, and the cutting cord may be moved or even removed from the head main body due to the centrifugal force during the brush cutting operation.

SUMMARY

One object of the invention is to provide a directly-attaching type rotary cutter for a brush cutter which can cope with a cutting cord of various thicknesses (diameters) with a simplified structure, while reducing time and labor for attaching/removing the cutting cord, improving the weight balance of the head main body to thereby suppress the vibrations, and realizing large gripping power for the cutting cord.

A first aspect of the invention provides a directly-attaching type rotary cutter (of a pressure member pushing type) for a brush cutter, including: a head main body including: a case; and a cover which covers the case, the case and the cover defining a cord guide hole; and a pressure member incorporated within the head main body so as to project from the head main body and so as to be rotated when being pushed inwardly of the head main body, the pressure member including: a cord inserting guide hole formed to radially penetrate through the pressure member; and a concave-convex fitting mechanism configured to be fitted with the head main body, and wherein the pressure member is operable between: a first state in which the cord inserting guide hole of the pressure member is aligned with the cord guide hole of the head main body so that a cutting cord is insertable into the cord inserting guide hole and the cord guide hole; a second state in which the pressure member is pushed inwardly of the head main body from the first state; and a third state in which the pressure member is rotated with respect to the head main body from the second state so that the inserted cutting cord is made into a bent state, and wherein the concave-convex fitting mechanism of the pressure member fits with the head main body when the pressure member is in the third state so that a rotation of the pressure member is inhibited and the inserted cutting cord is held in the bent state.

In order to stabilize the rotation and fixation of the pressure member more accurately, there may be provided an elastic member which is interposed between the cover and the pressure member so as to urge the pressure member toward the case.

A second aspect of the invention provides a directly-attaching type rotary cutter (of a pressure member pulling type) for a brush cutter, including: a head main body including: a case; and a cover which covers the case, the case and the cover defining a cord guide hole; and a pressure member incorporated within the head main body so as to project from the head main body and so as to be rotated when being pulled outwardly of the head main body, the pressure member including: a cord inserting guide hole formed to radially penetrate through the pressure member; and an engagement mechanism configured to be engaged with the head main body, and wherein the pressure member is operable between: a first state in which the cord inserting guide hole of the pressure member is aligned with the cord guide hole of the head main body so that a cutting cord is insertable into the cord inserting guide hole and the cord guide hole; a second state in which the pressure member is pulled outwardly of the head main body from the first state; and a third state in which the pressure member is rotated with respect to the head main body from the second state so that the inserted cutting cord is made into a bent state, and wherein the engagement mechanism of the pressure member engages with the head main body when the pressure member is in the third state so that the inserted cutting cord is held in the bent state.

In order to stabilize the rotation and fixation of the pressure member more accurately, there may be provided an elastic member which is interposed between the pressure member and the case so as to urge the pressure member toward the cover.

As the elastic member, a spring or rubber may be used.

For example, a cutting cord having a proper length is attached to a rotary cutter for cutting lawns and weeds. When the cord is worn and shortened, the sharpness of the cord is deteriorated, and the efficiency of the brush cutting operation is lowered. Thus, to avoid lowering of the efficiency, it is preferable to keep the proper length of the cutting cord. According to the first aspect of the invention, when the cord is worn and shortened during the brush cutting operation, it can be replaced with a new cord by pushing and rotating the pressure member with respect to the head main body for removing the worn cord, by inserting the new cord into the head main body, and by pushing and rotating the pressure member with respect to the head main body. Further, the concave-convex fitting mechanism can fix the pressure member and can hold the cord in the bent state.

Also, according to the second aspect of the invention, when the cord is worn and shortened during the brush cutting operation, it can be replaced with a new cord by pulling and rotating the pressure member with respect to the head main body for removing the worn cord, by inserting the new cord into the head main body, and by pulling and rotating the pressure member with respect to the head main body. Further, the engagement mechanism can fix the pressure member and can hold the cord in the bent state.

In order surely prevent the pressure member incorporated into the head main body from becoming instable and from being shaken during the brush cutting operation in the above mentioned rotary cutters, an elastic member can be provided. The elastic member will be interposed between the cover and the pressure member so as to urge the pressure member toward the case in the pressure member pushing type rotary cutter, and will be interposed between the pressure member and the case so as to urge the pressure member toward the cover in the pressure member pulling type rotary cutter.

According to the above-mentioned rotary cutters, since the diameter of the cord inserting guide hole of the pressure member need not be set for a given size but can be formed rather large, the rotary cutter can fully cope with a cutting cord of various thicknesses (diameters). Since the cutting cord can be quickly attached onto and removed from the head main body by simply rotating the pressure member while pushing or pulling it with respect to the case, the cutting cord attaching and removing operation can be simplified greatly. Since the pressure member is incorporated in the central portion of the head main body, the weight balance of the whole head main body is good and thus the vibration of the head during the brush cutting operation can be suppressed. Since the cord can be held in the bent state due to the rotation of the pressure member, sufficient cord gripping force can be obtained, thereby preventing the cord from being moved or removed from the head main body due to the centrifugal force during the brush cutting operation. Since the elastic member for urging the pressure member is incorporated in the head main body, the rotation and fixation of the pressure member can be stabilized more accurately.

BRIEF DESCRIPTION OF DRAWINGS

FIG. 4A shows a state where the cord inserting guide hole of the pressure member is aligned with cord guides (a position for inserting a cord) of the case.

FIG. 4B shows a state where the pressure member is pushed and rotated (a position just before a position for holding the cord).

FIG. 4C shows a state where the case and the pressure member are concave-convex engaged (the position for holding the cord).

DETAILED DESCRIPTION

First Embodiment

Firstly, a rotary cutter for a brush cutter according to a first embodiment (a pressure member pushing type) will be described with reference to FIGS. 1 to 4. In the rotary cutter of the first embodiment, attachment and removal of a cutting cord 3 is performed while pushing a pressure member. In the rotary cutter, a head main body 1 is constituted of a case 1-1 and a cover 1-2, and a pressure member 2 is interposed therebetween. The pressure member 2 has a bottomed-cylindrical-shaped main body, a flat-blade-shaped grip portion 2-1 formed at the center of the bottom portion of the main body and a cord inserting guide hole 2-2 formed at the opening side of the main body. The cord inserting guide hole 2-2 has a size larger than the thickness (diameter) of the cutting cord 3, and extends parallel to the flat-blade-shaped grip portion 2-1 in the radial direction. A cord supporting pipe 2-3 is fitted inside the guide hole 2-2. For example, the cord supporting pipe 2-3 may be unnecessary and thus may be omitted from the configuration.

The case 1-1 includes a fit hole 1-1a at its central portion, and the pressure member 2 is engaged into the fit hole 1-1a so as to be rotatable and to be vertically movable. In the engaged state, the grip portion 2-1 of the pressure member 2 projects outwardly while the cord inserting guide hole 2-2 is positioned inwardly.

The case 1-1 includes: two projection portions 1-1b each having a hooked upper portion; two projection portions 1-1c each having a flat upper surface; and recess portions 1-1d and 1-1e respectively formed between the projection portions 1-1b and 1-1c. The projection portions 1-1b and 1-1c are formed on the inner bottom portion of the case 1-1 along an edge of the fit hole 1-1a. The two hooked projection portions 1-1b and the two flat projection portions 1-1c face with each other in the radial direction across the fit hole 1-1a, respectively.

The pressure member 2 includes a concave-convex fitting mechanism configured to engage with the case 1-1 in a hooked manner. The concave-convex fitting mechanism includes: recess portions 2-4a and 2-4b; and hooked projection portions 2-4c. The recess portions 2-4a and 2-4b are respectively formed on sides of two openings of the cord inserting guide hole 2-2, and concave-convex fit with the hooked projection portions 1-1b of the case 1-1, respectively. The hooked projection portions 2-4c concave-convex fit with the recess portions 1-1d and 1-1e on the case 1-1, respectively. When the hooked projection portions 1-1b of the case 1-1 concave-convex fit with the recess portions 2-4b of the pressure member 2, due to hooking between the hooked projection portions 1-1b and 2-4c, the pressure member 2 is prevented from being moved inwardly of the head main body 1.

Figure 2:
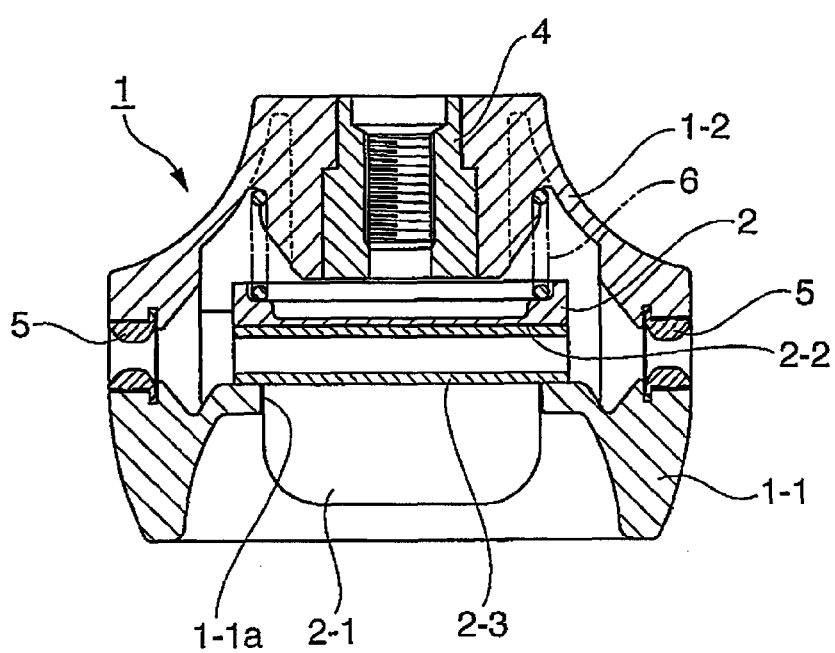
FIG. 2 is a longitudinal section view of the rotary cutter according to the first embodiment.

Cord guides 5 are interposed between the case 1-1 and the cover 1-2 so as to guide inserting and pulling-out of the cutting cord 3 into and from the head main body 1 when they are aligned with the cord inserting guide hole 2-2 formed in the pressure member 2. In the other words, the cord guides 5 define a cord guide hole in the head main body 1. As shown in FIG. 2, a nut member 4 is fixed to the central portion of the cover 1-2. The nut member 4 is used to connect the driving rotation shaft (not shown) of a motor or the like.

In the first embodiment, an elastic member 6 is interposed between the cover 1-2 and the pressure member 2 in order to urge the pressure member 2 toward the case 1-1 and to thereby stabilize the rotation and fixation of the pressure member 2. However, the elastic member 6 may be omitted. Although the specific structure for the concave-convex fitting mechanism is exemplified above, it is not limited thereto, and any kinds of concave-convex fitting mechanisms can be used as long as they can provide similar operational effects.

Figure 1:
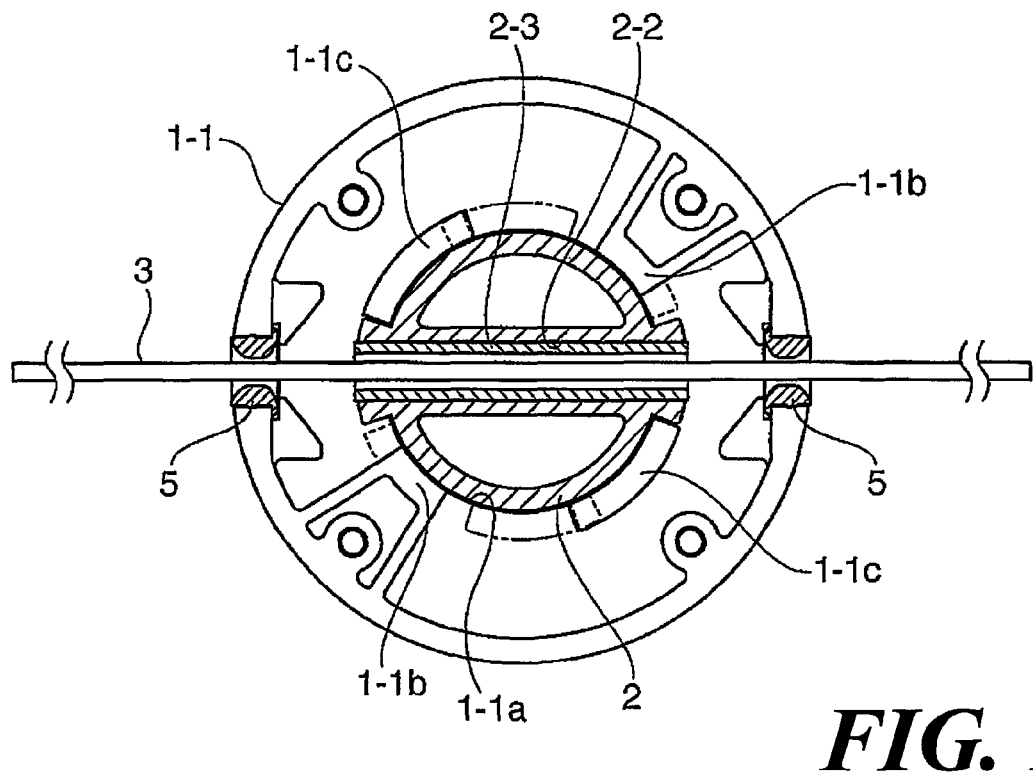
FIG. 1 is a transverse section view of a rotary cutter for a brush cutter according to a first embodiment (a pressure member pushing type), with a cover removed therefrom.

In the rotary cutter (of a pressure member pushing type) having the structure shown in FIGS. 1 to 4C, to attach the cutting cord 3 onto the head main body 1, first the pressure member 2 is operated so that the cord inserting guide hole 2-2 and the cord guides 5 are situated on the same straight line, as shown in FIGS. 1 and 2.

Figure 4A:
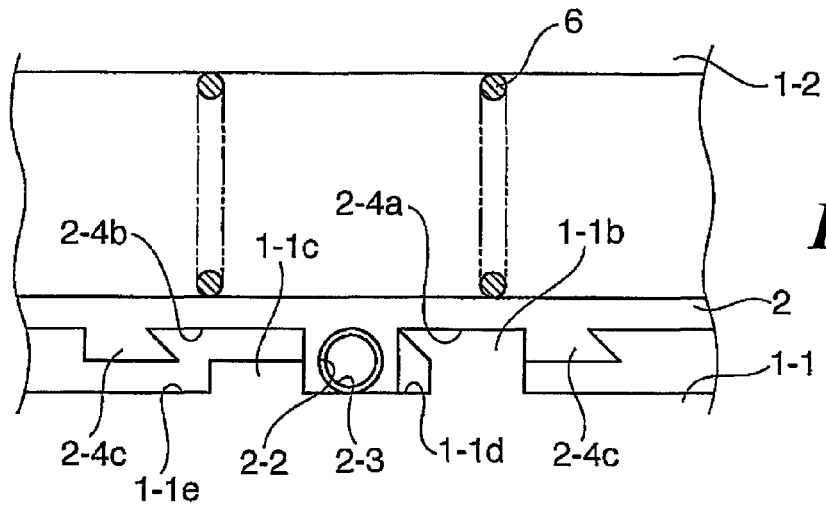
FIGS. 4A to 4C are schematic explanatory views, showing a concave-convex fitting mechanism for engagement between a case and a pressure member of the rotary cutter according to the first embodiment.

In this state, as shown in FIG. 4A, the pressure member 2 is fixed due to the concave-convex engagement between the hooked projection portion 1-1b of the case 1-1 and the recess portion 2-4a of the pressure member 2. Then, one end of the cutting cord 3 is introduced from the cord guide 5 into the head main body 1. Thereafter, the inserted end of the cutting cord 3 is guided out from the opposite cord guide 5 through the cord inserting guide hole 2-2 of the pressure member 2, and the position of the cutting cord 3 is adjusted so that lengths of both projection ends of the cutting cord 3 become substantially equal.

Figure 4B:
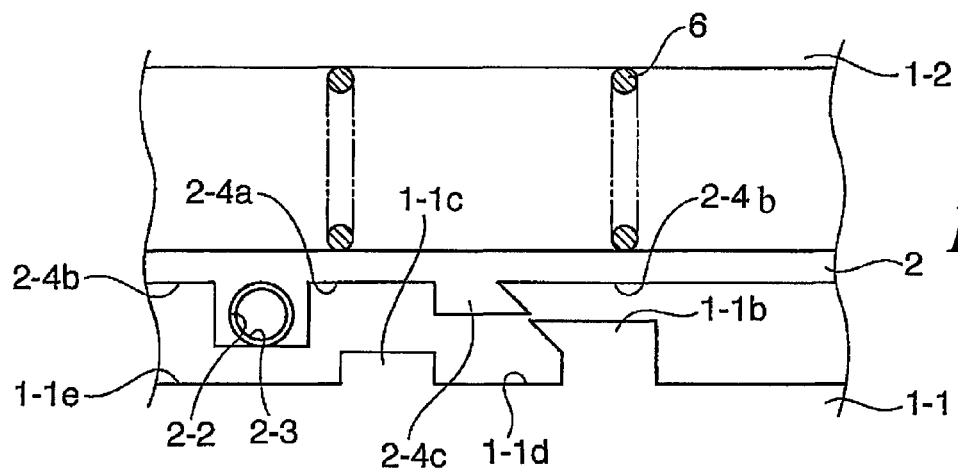

Next, by gripping the grip portion 2-1 (shown in FIG. 2), the pressing member 2 is pushed into the case 1-1 against the elastic member 6 so that the concave-convex engagement between the case 1-1 and the pressure member 2 is released, and then, the pressure member 2 is rotated so that the cutting cord 3 is bent as shown in FIG. 4B. While rotating the pressure member 2, the cord inserting guide hole 2-2 of the pressure member 2 may slide over the upper surface of the flat projection portion 1-1c.

Figure 3:
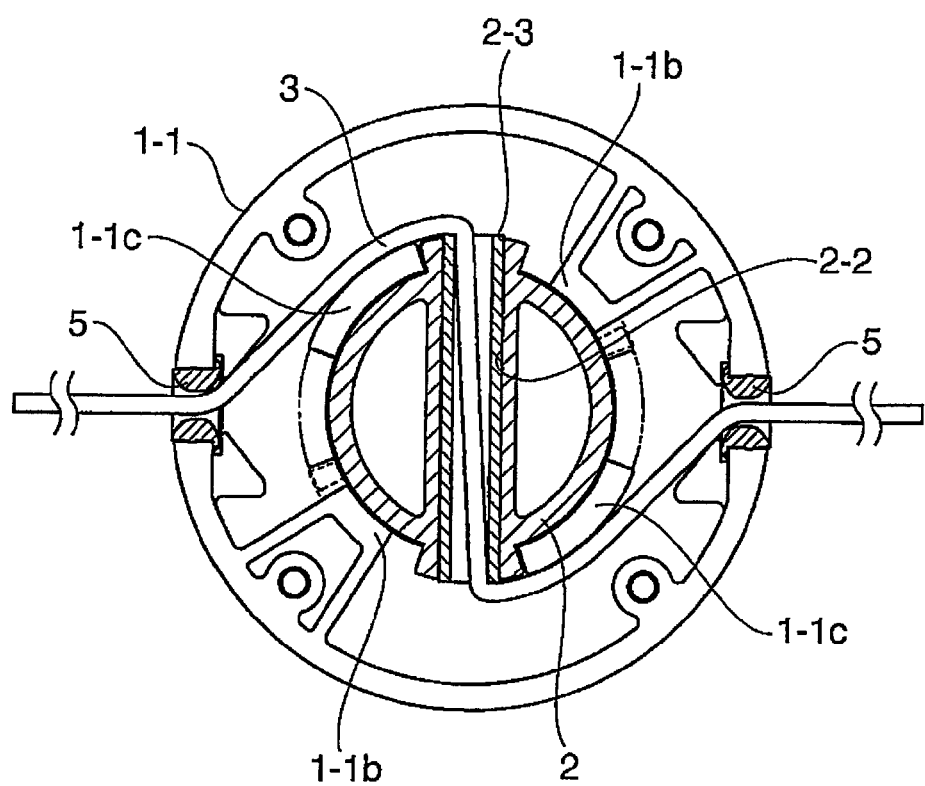
FIG. 3 is a view corresponding to FIG. 1, showing the operation of the rotary cutter according to the first embodiment with a cord fixed and held.
Figure 4C:
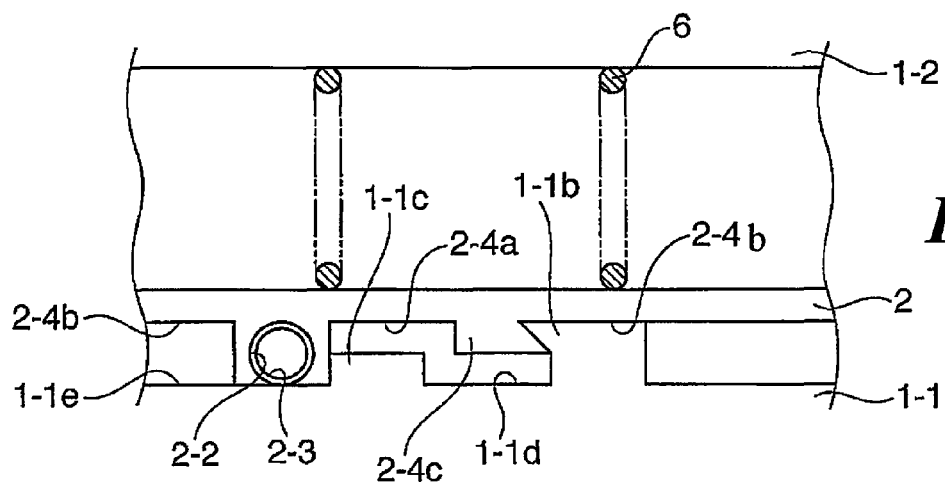

Then, by releasing the grip portion 2-1, as shown in FIG. 4C, the pressure member 2 is fixed again due to concave-convex engagement between the hooked projection portions 1-1b of the case 1-1 and the recess portions 2-4b of the pressure member 2 and concave-convex engagement between the cord inserting guide hole 2-2 and the recess portions 1-1e. Thus, the cutting cord 3 is held in the bent state as shown in FIG. 3. In this state, as shown in FIG. 4C, since the pressure member 2 is prevented from not only being pushed inwardly but also being rotated reversely rotated due to the engagement between the hooked projection portions 1-1b of the case 1-1 and the recess portions 2-4c of the pressure member 2. Therefore, when the rotary cutter rotates, the cutting cord 3 will not be loosened or removed.

To replace the worn cord with a new cord, the pressure member 2 is pushed into the case 1-1 and rotated reversely. Thus, the worn cord can be loosened and removed from the head main body 1. Then, after the new cord 3 has been inserted into the head main body 1, the pressure member 2 is pushed and rotated with respect to the case 1-1 as the same procedure as described above.

Second Embodiment

Next, a rotary cutter for a brush cutter according to a second embodiment (a pressure member pulling type) will be described with reference to FIGS. 5 to 7. In the rotary cutter of the second embodiment, attachment and removal of a cutting cord 13 is performed while pulling a pressure member. In the rotary cutter, a head main body 11 is constituted of a case 11-1 and a cover 11-2, and a pressure member 12 is interposed therebetween. The pressure member 12 includes a bottomed-and-flanged-cylindrical-shaped main body. The main body of the pressure member 12 is longer than that of the pressure member 2 of the first embodiment. The pressure member 12 also includes a flat-blade-shaped grip portion 12-1 formed at the center of the bottom portion of the main body and a cord inserting guide hole 12-2 formed near to the upper portion of the grip portion 12-1. The cord inserting guide hole 12-2 has a size larger than the thickness (diameter) of the cutting cord 13, and extends parallel to the flat-blade-shaped grip portion 12-1 in the radial direction. A cord supporting pipe 12-3 is fitted inside the guide hole 12-2. In the second embodiment, the cord supporting pipe 12-3 constitutes a part of a below-described engagement mechanism. The cord supporting pipe 12-3 is longer than the cord inserting guide hole 12-2 so as to project beyond a side wall of the pressure member 12 in the radial direction. Instead of using the separate cord supporting pipe 12-3, the pressure member 12 itself may be made longer in the radial direction, for example, by forming projecting portions (not shown) around two opening ends of the cord inserting guide hole 12-2.

The pressure member 12 is engaged into a fit hole 11-1*a* formed in the central portion of the case 11-1 so as to be rotatable and to be vertically movable so that the grip portion 12-1 projects outwardly while the cord inserting guide hole 12-2 is positioned inwardly. The cover 11-2 is mounted so as to cover the case 11-1 and the pressure member 12.

The cover 11-2 includes an inwardly-projected support cylindrical portion 17 at the central portion thereof, and the cylindrical main body of the pressure member 12 is mounted on the support cylindrical portion 17 so as to be vertically slidable and rotatable. A nut member 14 for connecting the driving rotation shaft (not shown) of a motor or the like is mounted to the support cylindrical portion 17.

In the second embodiment, although the specific structure is not exemplified, the pressure member 12 includes a concave-convex fitting mechanism configured to engage with the case 11-1 in a hooked manner, as in the first embodiment.

In addition, in this embodiment, the pressure member 12 includes an engagement mechanism for contacting and engaging with the case 11-1 in the rotation direction. The engagement mechanism includes a pair of radially opposed arc-shaped projections 11-1*b* provided on the inner bottom portion of the case 11-1 along an edge of the fit hole 11-1*a*, and the two end projecting portions 12-3*a* of the cord supporting pipe 12-3 fitted inside the cord inserting guide hole 12-2 of the pressure member 12.

The pressure member 12 contacts and engages with the case 11-1 in the rotation direction to thereby be fixed. The two end projecting portions 12-3*a* of the cord supporting pipe 12-3 projecting beyond the side wall of the pressure member 12 also function to prevent the pressure member 12 from being disassembled from the case 11-1 by contacting with the peripheral edge of the fit hole 11-1*a*.

Cord guides 15 are interposed between the case 11-1 and the cover 11-2 so as to guide inserting and pulling-out of the cutting cord 13 into and from the head main body 11 when they are aligned with the cord inserting guide hole 12-2 formed in the pressure member 12. In the other words, the cord guides 15 define a cord guide hole in the head main body 11.

In the second embodiment, an elastic member 16 is interposed between the pressure member 12 (the flange portion) and the case 11-1 in order to urge the pressure member 12 toward the cover 11-2 to thereby stabilize the rotation and fixation of the pressure member 12. However, in this embodiment as well, the elastic member 16 may be omitted. Although the specific structure for the engagement mechanism is exemplified above, it is not limited thereto, and any kinds of engagement mechanisms can be used as long as they can provide similar operational effects.

Figure 5:
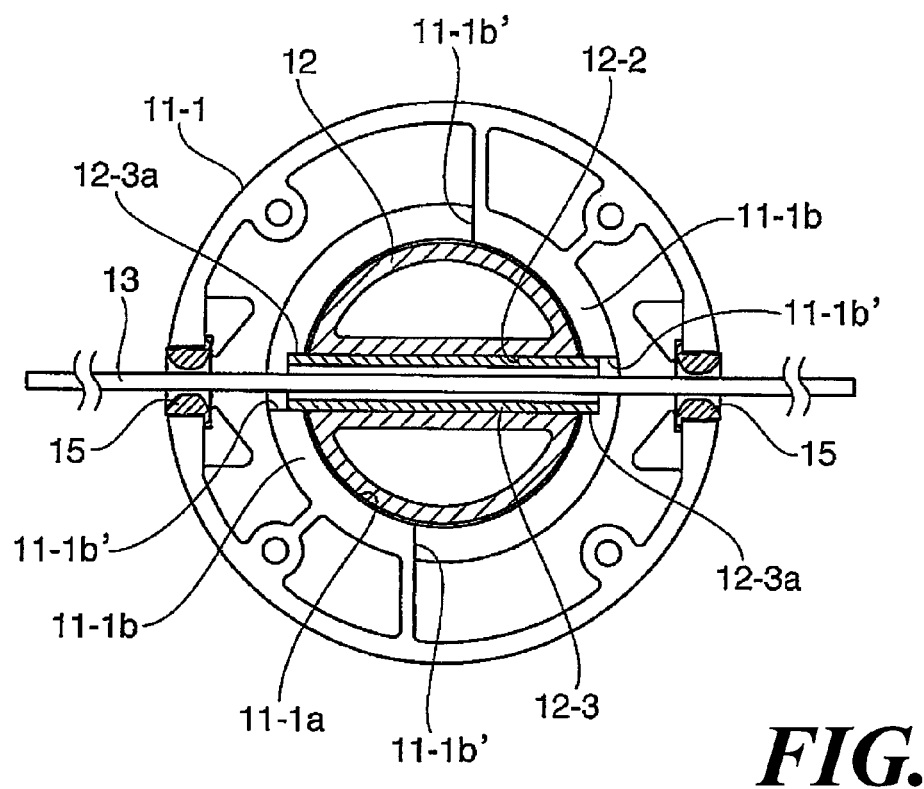
FIG. 5 is a transverse section view of a rotary cutter for a brush cutter according to a second embodiment (a pressure member pulling type), with a cover removed therefrom.
Figure 6:
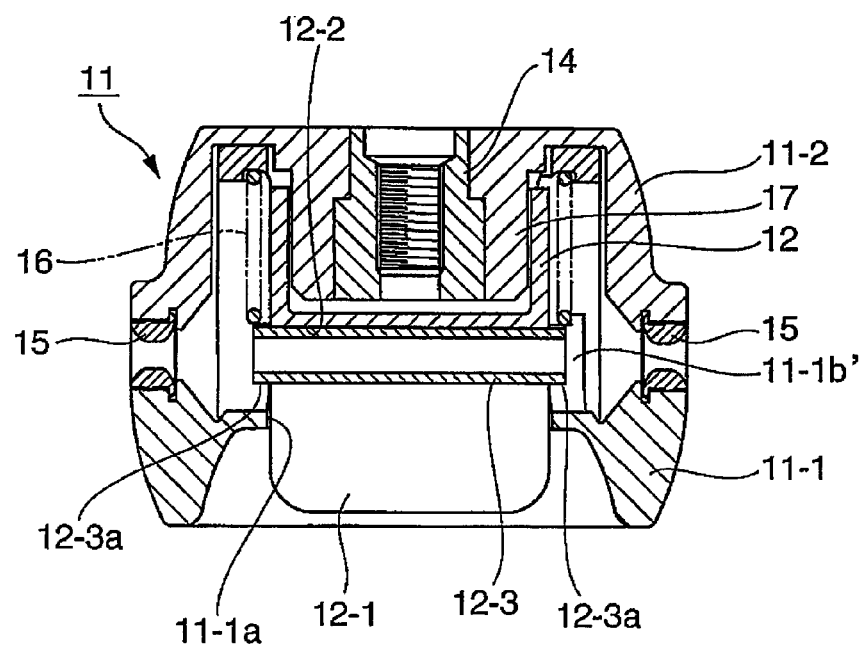
FIG. 6 is a longitudinal section view of the rotary cutter according to the second embodiment.
Figure 7:
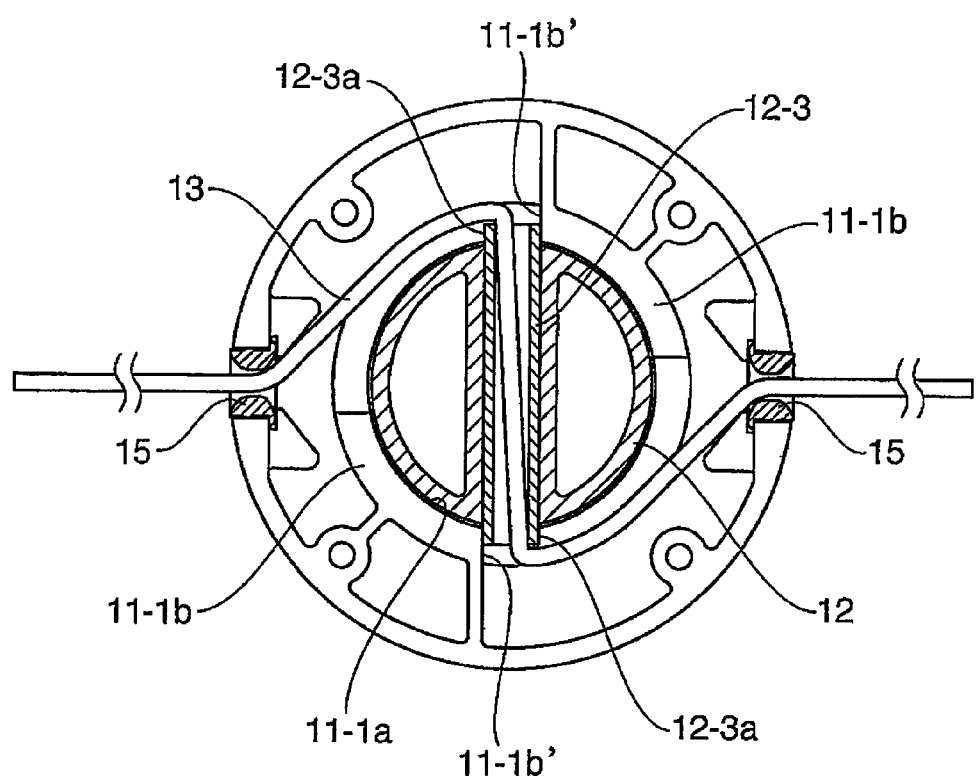
FIG. 7 is a view of the rotary cutter according to the second embodiment, showing a state where a cord is fixed and held.

In the rotary cutter (of a pressure member pulling type) having the structure shown in FIGS. 5 to 7, to attach the cutting cord 13 onto the head main body 11, first the pressure member 12 is operated so that the cord inserting guide hole 12-2 and the cord guides 15 are situated on the same straight line, as shown in FIGS. 5 and 6.

In this state, the pressure member 12 is held in a fixed state where the two end projecting portions 12-3*a* of the cord supporting pipe 12-3 are contacted and engaged with one stopper surfaces 11-1*b*' of the arc-shaped projections 11-1*b* of the engagement mechanism. Then, one end of the cutting cord 13 is introduced from the cord guide 15 into the head main body 11, the introduced end is guided out from the opposite cord guide 15 through the cord supporting pipe 12-3, and the cutting cord 13 is adjusted so that lengths of both projection ends of the cutting cord 13 become substantially equal.

Next, by gripping the grip portion 12-1, the pressure member 12 is pulled from the case 11-1 against the elastic member 16 and is rotated so that the two end projecting portions 12-3*a* of the cord supporting pipe 12-3 contact and engage with the other stopper surfaces 11-1*b*' of the arc-shaped projections 11-1*b* of the engagement mechanism while bending the cutting cord 13. Thus, the cutting cord 13 is held in the bent state as shown in FIG. 7.

To replace the worn cord with a new cord, the pressure member 12 is pulled from the case 1-1 and is rotated reversely. Thus, the worn cord can be loosened and removed from the head main body 11. Then, after the new cord 13 has been inserted into the head main body 11, the pressure member 12 is pulled and rotated with respect to the case 11-1 as the same procedure as described above.

As described above, in the rotary cutter (of a pressure member pushing type) of the first embodiment and the rotary cutter (of a pressure member pulling type) of the second embodiment, the diameters of the cord inserting guide holes 2-2 and 12-2 to be formed in the pressure members 2 and 12 need not be set specially but can be set arbitrarily, whereby they can sufficiently cope with the cutting cords 3 and 13 of various thicknesses (diameters). Also, attaching and removing of the cutting cords 3 and 13 with respect to the head main bodies 1 and 11 can be performed easily and quickly by simply rotating the pressure members 2 and 12 while pushing or pulling them with respect to the cases 1-1 and 11-1.

Since the pressure members 2 and 12 are incorporated in the central portions of the head main bodies 1 and 11, the weight balance of the whole of the head main body is good and thus the head is almost free from vibrations during the brush cutting operation. And, since the cords 3 and 13 are held at the bent state by the rotation of the pressure members 2 and 12, sufficient force for gripping the cord 3 and 13 can be obtained, thereby preventing the cords 3 and 13 from being loosened or removed from the head main bodies 1 and 11 due to the centrifugal force. Moreover, since the elastic members 6 and 16 for urging the pressure members 2, 12 are incorporated in the head main bodies 1 and 11, the rotation and fixation of the pressure members 2 and 12 can be stabilized.

The invention claimed is:

1. A rotary cutter of a non reel-winding type for a brush cutter, comprising:
   a head main body including:
      a case; and
      a cover which covers the case, the case and the cover defining a cord guide hole; and
   a pressure member incorporated within the head main body so as to project from the head main body and so as to be rotated when being pushed inwardly of the head main body, the pressure member including:
      a cord inserting guide hole formed to radially penetrate through the pressure member; and a concave-convex fitting mechanism configured to be fitted with the head main body, and wherein the pressure member is operable between:

a first state in which the cord inserting guide hole of the pressure member is linearly aligned with the cord guide hole of the head main body so that the cord inserting guide hole and the cord guide hole maintain a straight line orientation and so that a cutting cord is insertable and exits along a straight line into and through the cord inserting guide hole and the cord guide hole; and a second state in which the pressure member is pushed inwardly of the head main body from the first state to thereby disengage the concave-convex fitting mechanism with the head main body so that the pressure member is rotatable in clockwise and counter-clockwise directions;

a third state in which the pressure member is rotated with respect to the head main body from the second state so that the inserted cutting cord is made into a bent state, and wherein the concave-convex fitting mechanism of the pressure member fits with the head main body when the pressure member is in the third state so that a rotation of the pressure member is inhibited and the inserted cutting cord is held in the bent state.

2. The rotary cutter of claim 1, further comprising:

an elastic member which is interposed between the cover and the pressure member so as to urge the pressure member toward the case.

3. A rotary cutter of a non reel-winding type for a brush cutter, comprising:

a head main body including:
  a case; and
  a cover which covers the case, the case and the cover defining a cord guide hole; and a pressure member incorporated within the head main body so as to project from the head main body and so as to be rotated when being pulled outwardly of the head main body, the pressure member including:

a cord inserting guide hole formed to radially penetrate through the pressure member; and an engagement mechanism configured to be engaged with the head main body, and wherein the pressure member is operable between:

a first state in which the cord inserting guide hole of the pressure member is linearly aligned with the cord guide hole of the head main body so that the cord inserting guide hole and the cord guide hole maintain a straight line orientation and so that a cutting cord is insertable and exits along a straight line into and through the cord inserting guide hole and the cord guide hole; and a second state in which the pressure member is pulled outwardly of the head main body from the first state to thereby disengage the concave-convex fitting mechanism with the head main body so that the pressure member is rotatable in both clockwise and counter-clockwise directions;

a third state in which the pressure member is rotated with respect to the head main body from the second state so that the inserted cutting cord is made into a bent state, and wherein the engagement mechanism of the pressure member engages with the head main body when the pressure member is in the third state so that the inserted cutting cord is held in the bent state.

4. The rotary cutter of claim 3, further comprising:

an elastic member which is interposed between the pressure member and the case so as to urge the pressure member toward the cover.

\* \* \* \* \*